(12) United States Patent
Ueda et al.

(10) Patent No.: US 6,169,746 B1
(45) Date of Patent: *Jan. 2, 2001

(54) SIGNAL TRANSMISSION SYSTEM FOR HIGH SPEED SERIAL BUS

(75) Inventors: Toru Ueda, Soraku-gun; Kazuyuki Sumi, Nara; Takashi Nishimura, Tenri, all of (JP); Hirohisa Wakai, Forest City, CA (US)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/174,400

(22) Filed: Oct. 14, 1998

(30) Foreign Application Priority Data

Oct. 15, 1997 (JP) .................................................. 9-281621
Sep. 11, 1998 (JP) ................................................ 10-257904

(51) Int. Cl.[7] ........................................................ H04J 3/16
(52) U.S. Cl. ........................... 370/466; 370/467; 370/279
(58) Field of Search .................................... 359/173, 188; 370/276, 278, 282, 294, 465, 466, 467, 279, 293, 296, 295

(56) References Cited

U.S. PATENT DOCUMENTS

| | | | | |
|---|---|---|---|---|
| 5,577,146 | * | 11/1996 | Musk | 385/92 |
| 5,787,259 | * | 7/1998 | Haroun et al. | 395/200.83 |
| 5,841,471 | * | 11/1998 | Endsley et al. | 348/231 |
| 5,909,555 | * | 6/1999 | Jung | 709/253 |
| 5,915,130 | * | 6/1999 | Kim | 395/888 |
| 5,953,340 | * | 9/1999 | Scott et al. | 370/465 |
| 6,014,381 | * | 1/2000 | Troxel et al. | 370/395 |
| 6,072,803 | * | 6/2000 | Allmond et al. | 370/465 |
| 6,074,111 | * | 6/2000 | Kasahara | 400/76 |

FOREIGN PATENT DOCUMENTS 10-164107   6/1998   (JP) .

* cited by examiner

*Primary Examiner*—Ajit Patel
*Assistant Examiner*—Hanh Nguyen
(74) *Attorney, Agent, or Firm*—Dike, Bronstein, Roberts & Cushman, LLP; David G. Conlin; David A. Tucker

(57) ABSTRACT

Between two nodes, data in the form of two different signals are transmitted bidirectionally, in accordance with IEEE1394 through one optical fiber cable. At the time of data transmission, data of two different signals is converted to data of one type of signal at one node, and transmitted to the optical fiber cable, and at the other node, the data received from the optical fiber cable is converted to the original data of two different signals, and transmitted to a subsequent processing circuit in accordance with IEEE1394. At this time, in a transmission sequence for requesting and granting priority of transmission over the optical fiber cable between both nodes, the priority of transmission is granted alternately to both nodes.

9 Claims, 14 Drawing Sheets

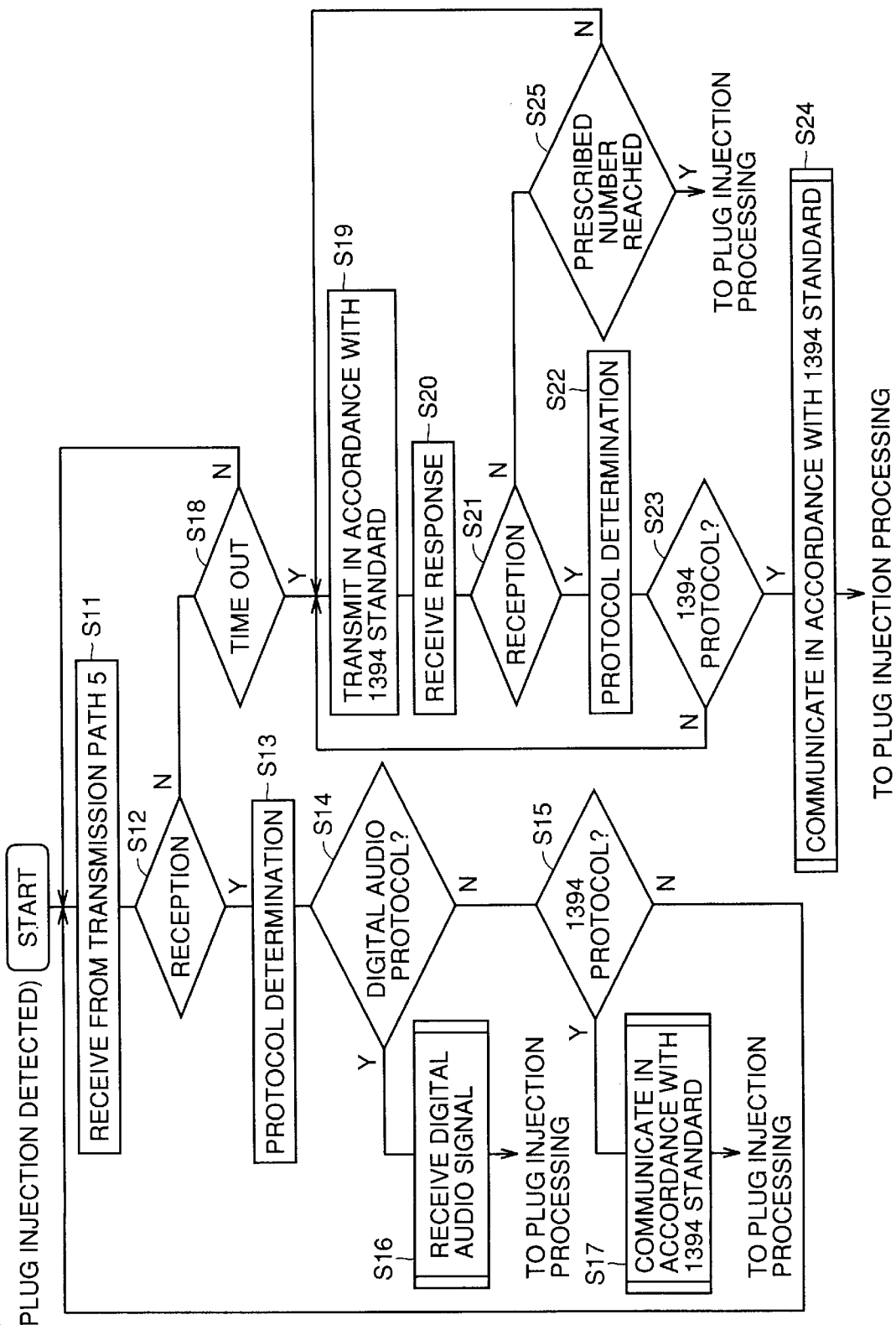

FIG.8A

SEQUENCE WHEN PLUG IS INJECTED

COUNTER NODE CORRESPONDS TO 1394 STANDARD

THIS SIDE NODE — THE OTHER NODE

- (PLUG NOT YET INJECTED) INJECTION DETECTED
- (PLUG INJECTED) WAIT RECEPTION
- CONNECTION PROCESS IN ACCORDANCE WITH 1394 STANDARD
  - TRANSMIT BUS RESET
  - TRANSMIT BUS RESET
  - RESPONSE
- START TRANSMISSION SEQUENCE IN ACCORDANCE WITH 1394 STANDARD

FIG.8B

COUNTER NODE DOES NOT CORRESPOND TO 1394 STANDARD
(DIGITAL AUDIO SIGNAL BEING TRANSMITTED)

THIS SIDE NODE — THE OTHER NODE

- INJECTION DETECTED
- RECEPTION
- PROTOCOL DETERMINATION
- RECEIVE DIGITAL AUDIO SIGNAL
  - DIGITAL AUDIO SIGNAL

FIG.13
FIG.14A PRIOR ART    FIG.14B PRIOR ART
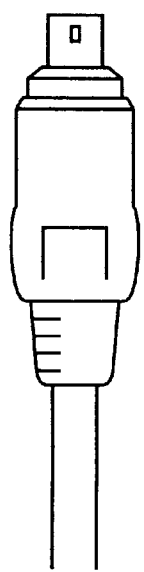    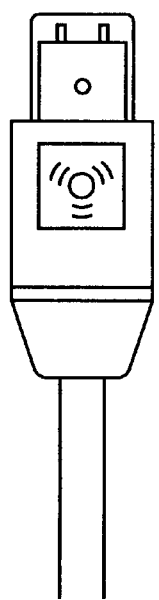

SIGNAL TRANSMISSION SYSTEM FOR HIGH SPEED SERIAL BUS

BACKGROUND OF THE INVENTION

1. Field of the Invention

The present invention relates to a signal transmission apparatus for transmitting and receiving digital data related to video signals, audio signals and so on, and more particularly to a signal transmission apparatus to which standard specification of a high speed serial bus is applied.

2. Description of the Background Art

IEEE 1394-1995 (which represents IEEE Standard for a High Performance Serial Bus IEEE Std IEEE 1394-1995, hereinafter simply referred to as "1394") is a specification of a serial bus for high speed data transmission in serial manner. Transmission rates of 100 Mbps, 200 Mbps and 400 Mbps ("bps" stands for bit/sec) are specified in 1394, and various corresponding controller LSIs have been commercially available.

Different from the conventional networks such as Ethernet, the feature of 1394 resides in that it specifies a scheme for synchronous transfer suitable for real time information transfer required especially in the field of motion pictures and music. The standard specification 1394 is applied for a digital camera, allowing transfer of video data recorded in digital manner. At present, application not only to the digital camera but also to a digital tuner, a digital video disk (DVD), a personal computer, a hard disk and a printer has been studied.

FIGS. 14A and 14B show appearances of conventional 6-pin plug and 4-pin plug specified in 1394.

FIGS. 15A to 15C show the shape of the plug of FIG. 14B. These figures are excerpts from IEEE Standard for a High Performance Serial Bus IEEE Std IEEE1394-1995. FIGS. 15A to 15C represents the top, side and a contact surface with the jack of the plug shown in FIG. 14B, respectively. As the plug has 6 electrodes P1 to P6, it is difficult to reduce the size thereof.

The 1394 standard is for transferring two types of signals, that is, data and strobe, by using two pairs, that is, a total of four lines by differentiation, utilizing electric signals (when 6 pins are provided, remaining two are used for transmitting power), and operation over a length of 4.5 m is specified. As an extended specification of the standard, a specification defining an operation at a high speed of 800 Mbps of higher over a long distance of 50 m, for example, has been studied, and in order to implement the operation in accordance with the extended specification, a method of transmission utilizing light has been proposed. This method of transmission utilizes two optical fibers, one allotted for outgoing and the other allotted for incoming signals independently from each other for transmission.

FIG. 16 shows shapes of conventionally proposed optical jack and plug (RECEPTACLE). FIG. 17 represents state of signals flowing through a cable at the time of data transmission in accordance with 1394 standard in a prior art example and an embodiment of the present invention. In this figure, the portion denoted by "arb" requires bidirectional simultaneous communication. Referring to FIG. 1, the plug connects to optical fibers. The respective optical fibers allow the simultaneous bidirectional communication corresponding to the portion denoted by "arb" of FIG. 17, by a combination of unidirectional signal lines which serve to input and output signals.

Japanese Patent Laying-Open No. 10-164107 discloses a method of application of an optical fiber in accordance with 1394 standard. The technique disclosed in this laid-open application is silent about the number of optical fibers used. However, it is impossible by the described method to reduce the number of optical fibers to be used to only one, simply by converting a code notifying transmission rate used in accordance with 1394 standard to a digital symbol. The reason is as follows. If only such a simple conversion is performed and two controllers (referred to as nodes) in accordance with 1394 standard connected by the optical fiber transmit digital signals over the optical fiber in asynchronous manner, it becomes necessary for each node to emit light by an LED or laser for signal transmission and, at the same time, to receive optical signal at a light receiving element the optical signal transmitted from the counterpart node. In other words, light emission and light reception must be done simultaneously by one same node. If this is realized by one optical fiber, the light emitted from the node of itself is reflected at an end surface of the optical fiber or the like and returns superposed on the optical signal transmitted from the counterpart node, which returning light eventually appearing as noise on the received signal. Because of this noise, signal transmission is impossible when the number of optical fibers is simply reduced to one.

As described above, the technique for increasing the transmission rate and to elongate the transmission path has been under development, in which technique signal transmission is performed by applying optical fibers to 1394 standard.

When 1394 standard employing two optical fibers, one for outgoing and the other for incoming signals, is applied to an information equipment, however, connectors and cables including the plug occupy large space in the information equipment, hindering reduction in size of the information equipment. Accordingly, the use at present of 1394 standard employing two optical fibers for the outgoing and incoming signals is limited to one in that the jack is embedded in a wall for transferring data between rooms.

When a method of signal transfer utilizing two optical fibers is applied as it is to signal transfer using only one optical fiber, normal signal transmission operation cannot be ensured, as light emitted from one node and reflected interferes with the light receiving operation of the node itself.

Further, according to 1394 standard, the shapes of the plug and the jack constituting a connector are determined, at least four metal lines are necessary for electrical connection of four signal lines, and a shield is necessary for suppressing generation of radio wave noise derived from high speed operation. Therefore, it is difficult in accordance with this standard to reduce the size of the cable or the connector.

Further, among information equipments, there has already been ones provided with a jack for digital audio optical transmission (EIAJ CP-1201 digital audio interface), as an optical interface. If such an information equipment is additionally provided with the interface function in accordance with 1394 standard, two different types of jacks are necessary for digital transmission/reception, hindering reduction in size of the equipment.

SUMMARY OF THE INVENTION

Therefore, an object of the present invention is to provide a signal transmission apparatus which allows reduction in sizes of a cable, a jack and a plug related to signal transmission path, reduction in electric noise and in power consumption.

The above described objects can be attained by the signal transmission apparatus for transmitting data in serial manner by mutual communication with another apparatus, including a cable connected to one end of the signal transmission apparatus, handling data as two types of signals for bidirectional simultaneous transmission; a communication path connected to the other end of the signal transmission apparatus for communication with the aforementioned another signal transmission apparatus; a first converting unit receiving data from the cable, converting the received data to one type of signal and outputting it to the communication path in data transmission; a second converting unit receiving one type of signal from the communication path, converting the received signal to data and outputting it to the cable, in data transmission; and a control unit for controlling the communication operation of the signal transmission apparatus in data transmission. The control unit grants transmission priority alternately to the signal transmission apparatuses in a control sequence of communication operation using the communication path.

Therefore, the data consisting of two types of signals received from the cable is converted to one type of signal and output to the communication path and bidirectional simultaneous communication of the cable, that is, the so-called full duplex communication is converted to a so-called half duplex communication in which priority of transmission is set alternately on the communication path for one and the other transmission apparatuses.

Accordingly, the communication path have only to be a half duplex communication path which can transmit one type of signal only. Therefore, even if the cable is a full duplex communication path transmitting two types of signals, the cost for a portion requiring connection with the communication path at the signal transmission apparatus can be reduced, the space occupied by this portion can be reduced and, in addition, power consumption for data transmission can be reduced.

The communication path connected to the above described signal transmission apparatus may be capable of transmitting signals in accordance with a plurality of protocols including at least a specified protocol specified for the cable. In that case, the signal transmission apparatus further includes a processing unit for receiving as an input and processing the signal in accordance with a protocol other than the specified protocol among the plurality of protocols, and a protocol determining unit for determining the protocol of the signal received from the communication path. The control unit includes a protocol control unit for controlling signal processing such that among the signals received from the communication path, a signal in accordance with the specified protocol is transmitted to the cable while a signal in accordance with a protocol other than the specified protocol is passed to a processing unit, in accordance with the determination by the protocol determined unit.

Accordingly, the signal transmission apparatus is capable of transmitting/receiving signals in accordance with a plurality of different protocols. This provides versatility of the signal transmission apparatus with respect to the protocols of the signals which can be transmitted through the communication path and the cable, increasing possible application of the apparatus.

When the communication path is connected to the signal transmission apparatus through a plug, the signal transmission apparatus comes to have the following configuration. The signal transmission apparatus includes a plug injection/ejection unit having a jack to and from which a plug is injected/ejected, and a plug detecting unit for detecting injection of the plug to the jack at the plug injection/ejection unit, and the control unit includes a reception maintaining unit for maintaining receiving operation for a prescribed time period until a signal is received from the communication path, in response to detection by the plug detection unit that the plug is injected to the jack.

Therefore, the signal transmission apparatus is economically advantageous, as signals in accordance with a plurality of different protocols can be transmitted/received by one set of plug and jack. Further, reduction in size of the signal transmission apparatus is not hindered, as it is unnecessary to prepare different sets of plug and jack for different protocols.

Further, in the signal transmission apparatus, from injection of the plug to the jack until the start of signal reception from the communication path, receiving operation is maintained for a prescribed time period, and therefore a flexible data transmission is possible in which the signal transmission apparatus is kept in waiting until another signal transmission apparatus is set to a communicable state with the corresponding plug inserted thereto.

The signal transmission apparatus may further include a transmission repeating unit responsive to failure of reception of a signal from the communication path by the reception maintaining unit under the control of the control unit, for repeatedly transmitting by a prescribed number of times a prescribed signal to the communication path until a response is received from the communication path.

When the reception maintaining unit cannot receive any signal from the communication path, the transmission repeating unit repeatedly transmits the prescribed signal for a prescribed number of times to the communication path until a response is received. Therefore, even when the signal transmission apparatus on the other side is in an intermittent reception mode for power saving, for example, the signal transmission apparatus on this side is kept in waiting until the other signal transmission apparatus enters the communicable state, and thus a flexible data transmission method is implemented.

The communication path connected to the above described signal transmission apparatus may be formed of one optical fiber cable. With the communication path being formed of one optical fiber cable, the number of optical fiber cables can be reduced to one half as compared with the prior art, whereby cost of the signal transmission apparatus is reduced, the structure is simplified, reliability is improved and power consumption is reduced.

Further, even when data is transmitted between the signal transmission apparatuses using one optical fiber cable, the influence of noise caused by the emitted optical signal on the received optical signal is avoided by the control effected by the control unit, and therefore accuracy of the transmission/reception signals can be maintained.

Further, as optical signal is used on the communication path, the conventional radio wave noise experienced in a high speed operation is not generated. Accordingly, it is unnecessary to provide a shield for the radio wave noise, which is economically advantageous.

In the above-described signal transmission apparatus, the signal in accordance with a protocol other than the specified protocol includes a digital audio signal.

Therefore, in the signal transmission apparatus, the digital audio signals are also transmitted/received, and therefore an information equipment for processing the digital audio signals can be connected to the processing side, which increases possible application of the signal transmission apparatus.

In the above described signal transmission apparatus, the shape of the plug may be the same as a mini plug. As the plug shape is adapted to be the same as a mini plug, the size of the plug can be reduced, and an optical fiber cable for transmitting digital audio signals which has been commercially available can be utilized as the communication path, which is economically advantageous.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a process flow at a full duplex-half duplex converting unit when a plug is injected in the second embodiment of the present invention.

FIGS. 8A and 8B show sequences of signal transmission corresponding to the flow of FIG. 7, respectively.

FIG. 13 shows an appearance of an optical fiber plug which has a shape of a mini jack, in accordance with a third embodiment of the present invention.

FIGS. 14A and 14B show appearances of conventional 6-pin plug and 4-pin plug specified in accordance with 1394 standard, respectively.

DESCRIPTION OF THE PREFERRED EMBODIMENTS

Embodiments of the present invention will be described in the following.

(First Embodiment)

In the first embodiment of the present invention, in optical communication in accordance with 1394 standard, not a full duplex communication using two optical fibers but half duplex communication in accordance with 1394 standard by one optical fiber is implemented by time divisional control.

According to 1394 standard, in a period when user data is transmitted/received, data is transmitted in one direction only. In other words, in this period, it is possible to utilize half duplex communication method for the communication operation. Here, the user data refers to an application data to be processed by a processing function on a node side. When the node side is an AV equipment, for example, the user data is audio data or image (still picture, motion picture) data. The half duplex communication refers to a method of implementing bidirectional communication by time divisional control, where bidirectional communication is possible but at a certain time point, data flows only in one direction. In this manner, at one node, the light receiving element and the light emitting element operate switched from each other by time divisional control. Therefore, the light emitted from the node itself will never be a returning light which undesirably appears as a noise on the reception signal.

Figure 17:
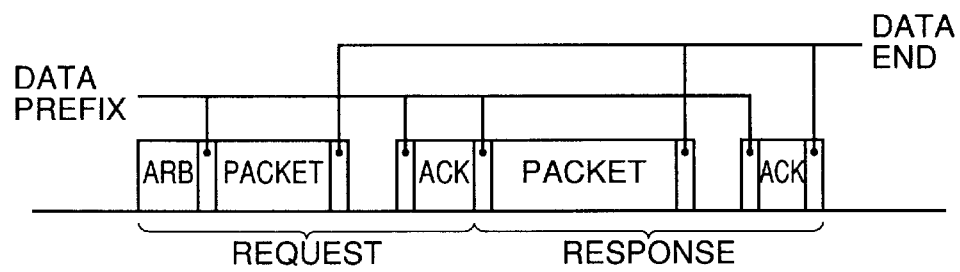
FIG. 17 shows a state of signals flowing through a cable at the time of data transmission in accordance with 1394 standard in the conventional example and in the embodiments of the present invention.

As already described with reference to FIG. 17, bidirectional simultaneous communication in accordance with 1394 standard takes place when one node acquires priority of transmission prior to transmission of user data to the other node. For example, an equipment (referred to as node) to which 1394 standard is applied requests priority of transmission to the other node connected therewith, to start a data transmission operation. At this time, the aforementioned one node drives four signal lines to a certain state (for example, a state of requesting priority of transmission). At the same time, the other node drives the same four signal lines to a state for granting the priority of transmission to said one node. The aforementioned one node which is going to start a transmission operation drives and at the same time reads signals from the driven four signal lines and determines whether the states of four signal lines driven by one and the other nodes are the same as the read states, so as to determine whether the transmission operation is possible or not. In this method of determination, it is necessary to transmit signals in two directions at one time. Therefore, this method has conventionally been implemented by two optical fibers for one and the other directions.

In the present embodiment, except the transmission of user data, time divisional pingpong operation (in which transmission and reception are repeated alternately) is utilized to provide quasi full duplex communication state, realizing data transmission through one optical fiber.

Here, optical communication using a plastic optical fiber (hereinafter simply referred to as POF) is described as an example of half duplex communication, though it is not not limiting. The present invention is similarly applicable when half duplex communication is performed utilizing wired or wireless electric signal communication, or infrared communication utilizing a space.

Figure 1:
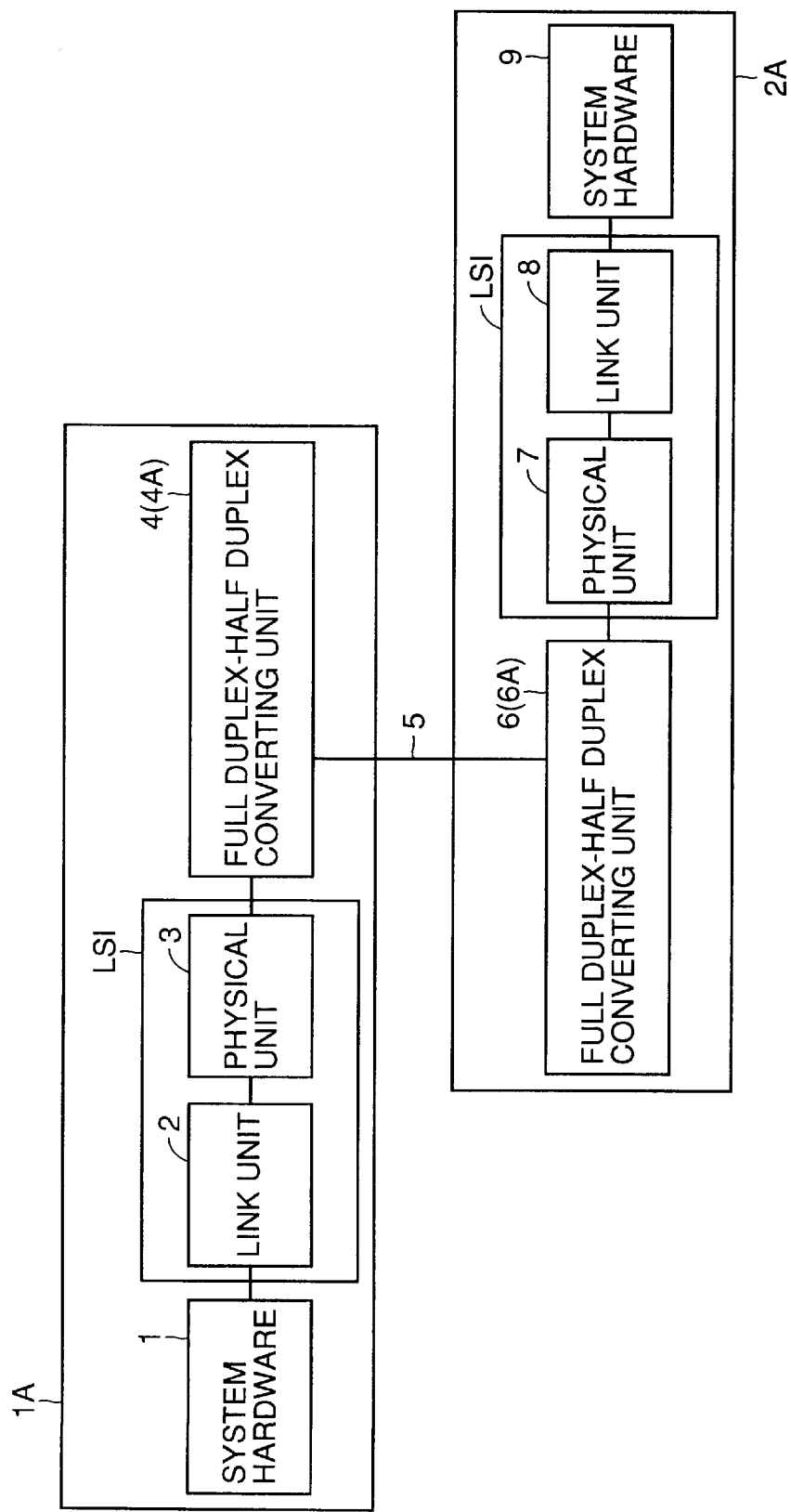
FIG. 1 is an overall block diagram of the signal transmission system to which 1394 standard is applied, in accordance with a first embodiment of the present invention.

FIG. 1 is an overall block diagram of a signal transmission system to which 1394 standard is applied, in accordance with the first embodiment of the present invention. Referring to FIG. 1, the signal transmission system includes a communication path 5 consisting of one POF in accordance with 1394 standard, which is a so-called half duplex communication path transmitting one type of signal in a single direction at a certain time point, and nodes 1A and 2A communicating and connected with each other through transmission path 5.

The structure of node 1A is the same as that of node 2A. Node 1A (2A) includes a system hardware 1 (9) which is a video equipment, for example, a link unit 2 (8) for processing related to a link layer of 1394 standard, a physical unit 3 (7) for processing related to a physical layer of 1394 standard, and a full duplex-half duplex converting unit 4 (6) for converting communication method on transmission path 5 between full duplex and half duplex communication methods from each other and converting electric signals and optical signals from each other.

Link unit 2 (8) and physical unit 3 (7) are both formed of well known electronic components (LSIs) satisfying 1394 standard, and therefore detailed description thereof is not given here.

System hardware 1 (9) is, for example, a personal computer, a mini disk player or a video camera, and digital data (for example, audio data or image data) and control data (command data for control) are input/output as data in accordance with 1394 standard.

Link unit 2 (8) extracts, among packets flowing through communication path 5 in accordance with 1394 standard, only that packet which is addressed to itself, and outputs the packet to hardware 1 (9), and in response to a request from system hardware 1 (9), issues packet transmission request to physical unit 3 (7).

Physical unit 3 (7) processes the packet flowing through transmission path 5 in accordance with 1394 standard. More specifically, it implements handshaking for adjusting timing of transmission of a packet data to be transmitted to the counterpart node, to transmission path 5.

Full duplex-half duplex converting unit 4 (6) receives as inputs two types of signals of the physical layer in accordance with 1394 standard output from physical unit 3 (7), converts the signals to one type of signals, transmit the converted signals to transmission path 5, and converts one type of signals received from transmission path 5 to two types of signals in accordance with 1394 standard and outputs the converted signals to physical unit 3 (7).

Here, it is assumed that full duplex-half duplex conversion takes place outside the physical unit 3 (7). The function of full duplex-half duplex conversion may be incorporated in a logic of physical unit 3 (7).

In FIG. 1, the full duplex-half duplex converting unit 4 (6) is also denoted as full duplex-half duplex converting unit 4A (6A) for convenience of later description of the second embodiment.

Figure 2:
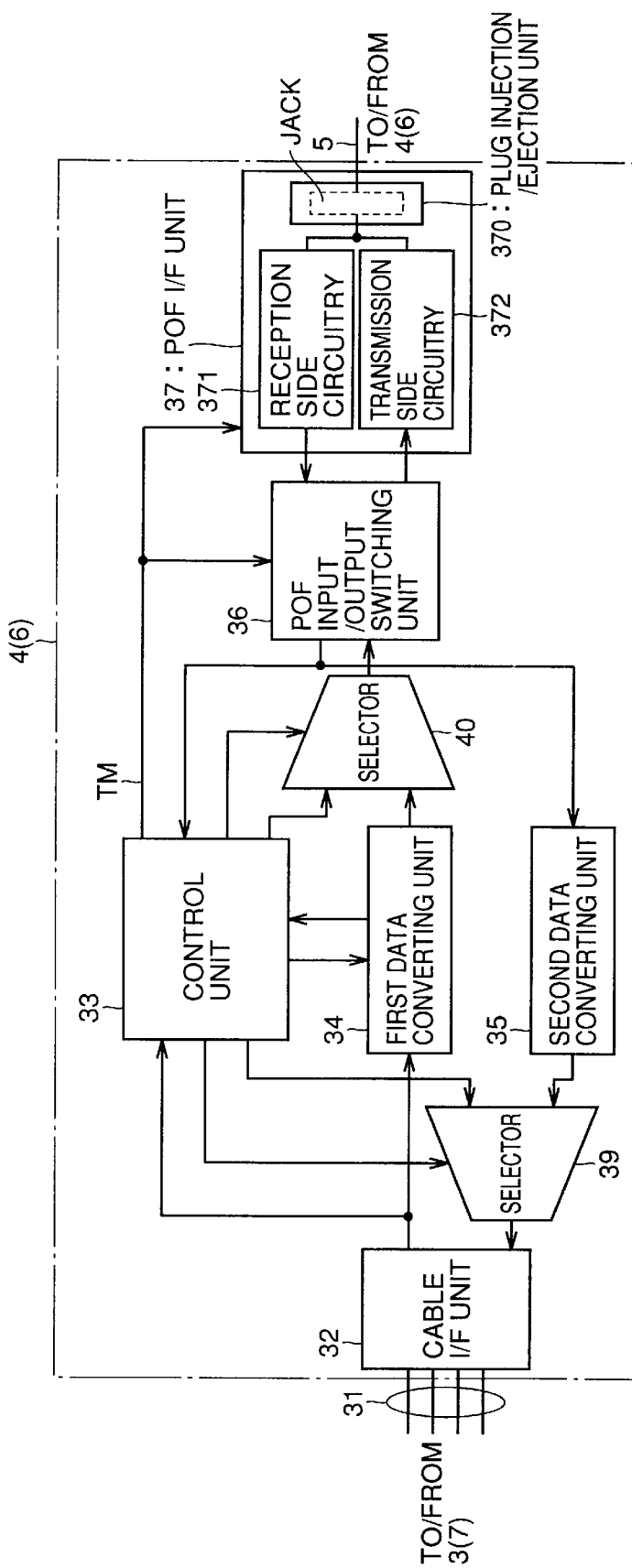
FIG. 2 is a detailed block diagram of a full duplex-half duplex converting unit shown in FIG. 1.

FIG. 2 is a detailed block diagram of full duplex-half duplex converting unit 4 (6) shown in FIG. 1.

Referring to FIG. 2, full duplex-half duplex converting unit 4 (6) includes a cable I/F (interface) unit 32 connecting a cable 31 for transmitting electric signals in accordance with 1394 standard, for signal input/output to and from physical unit 3 (7) through the cable 31, a control unit 33 for centralized control of full duplex-half duplex converting unit 4 (6) itself, first and second data converting units 34 and 35, a POF input/output switching unit 36, a POF I/F unit 37 connected to transmission path 5 for signal input/output to and from transmission path 5, and selectors 39 and 40.

Cable 31 includes four signal lines having one end connected to physical unit 3 (7). A signal line for supplying power is not shown.

Cable I/F unit 32 is formed of a receiver and a driver, for example, for obtaining a state of a signal on cable 31 and for driving a signal on cable 31. Therefore, the state of physical unit 3 (7) is detected by cable I/F unit 32.

Control unit 33 comprehends the state of physical unit 3 (7) based on the state of signals on cable 31 applied from cable I/F unit 32. For example, from the signals flowing through cable 31, it detects a state of IDLE (a state not transmitting any signal) or an information of DATA_PREFIX, in accordance with 1394 standard. At the same time, it analyzes a signal input from transmission path 5 and transmits the signal to physical unit 3 (7). This operation will be described in detail later with reference to a sequence.

The first data converting unit 34 is for converting information of the signal input from cable 31 to a signal representing optical information. In the cable 31 in accordance with 1394 standard, one signal is transmitted over two signal lines by differentiation, and two types of signals including data and clock are transmitted over four signal lines. This is called DS coding. It is possible for a receiving side to decode the DS coded reception signal without any external PLL (Phase Lock Loop). As only one type of signal can be transmitted over transmission path 5, code conversion with the clock superposed on the data takes place in the first data converting unit 34.

Coding technique for superposing clock component on data includes 4B5B coding and 8B10B coding. Such a coding technique is utilized in the first data converting unit 34. In accordance with such a coding technique, information for reproducing a clock is inserted at a prescribed bit position of a serial signal, and such coding technique has been used in existing network technique such as Ether Net and fiber channel.

In 4B5B coding, a data signal of 4 bits is converted to a data signal of 5 bits and, in the process of conversion, clock component is introduced to the signal. This enables the receiving side to decode data while extracting the clock from the reception signal, using a PLL. In the conventional method of transmission using two optical fibers for up and down signals respectively, the same method of coding/decoding is adopted.

The second data converting unit 35 converts the signal received through transmission path 5 to a signal in accordance with 1394 standard. Here, a code coded by 4B5B coding or 8B10B coding is converted to DS coding.

POF input/output switching unit 36 alternately switches transmission state and reception state of transmission path 5 in accordance with a switching timing TM applied from control unit 33. The function of switching by POF input/output switching unit 36 does not exist in the conventional system using two optical fibers.

POF I/F unit 37 has a plug injection/ejection unit 370 to and from which a plug, not shown, is injected/ejected, provided on the side of transmission path 5, a reception side circuitry 371 and a transmission side circuitry 372, for converting electric and optical signals to and from each other. In response to switching between input/output by POF input/output switching unit 36, that is, in accordance with that switching timing TM applied from control unit 33, POF I/F unit 37 operates time divisionally the transmission side circuitry 372 for electric→photo conversion and the reception side circuitry 371 for photo→electric conversion.

Selector 39 receives outputs from control unit 33 and data converting unit 35, and under the control by control unit 33, applies either one of the outputs to cable I/F unit 32. Selector 40 receives outputs from control unit 33 and data converting unit 34 and under the control of control unit 33, applies either one of the outputs to POF input/output switching unit 36. The switching timing of each selector is controlled by control unit 33 in the following manner.

More specifically, when the user data is to be transmitted between the one and the other nodes, input sides of selectors 40 and 39 are switched to the sides of the first and second data converting units 34 and 35, and otherwise, switched to the side of control unit 33.

Figure 3:
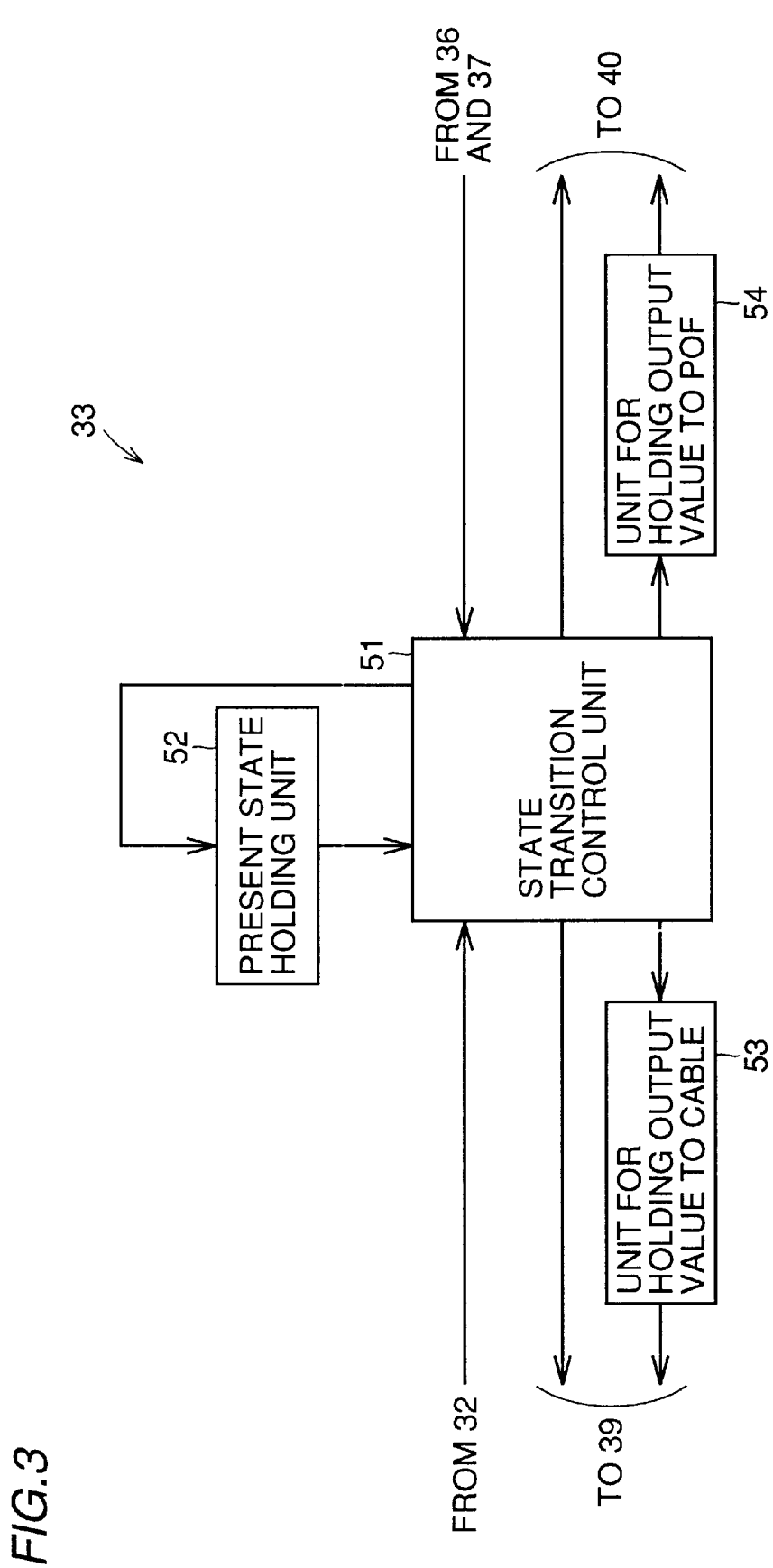
FIG. 3 is a detailed block diagram of the control unit shown in FIG. 2.

FIG. 3 is a detailed block diagram of control unit 33 shown in FIG. 2. Control unit 33 includes a state transition control unit 51, a present state holding unit 52, a unit 53 for holding an output value to the cable, and a unit 554 for holding an output value to the POF.

State transition control unit 51 processes in accordance with state transition on the side of transmission path 5 and on the side of cable 31, which process will be described in detail later.

Present state holding unit 52 holds present state with respect to state transition control unit 51. State transition control unit 51 determines the next operation (state) based on the present state held by present state holding unit 52, the state input from cable I/F unit 32, and the state input from POF I/F unit 37 through POF input/output switching unit 36.

The content of unit 53 holding an output value to the cable holds the value to be referred to by selector 39 and output to cable 31. The content of unit 54 holding the output value to POF holds a value to be referred to by selector 40 and output to transmission path 5, that is, the POF. These values are held and kept until a new value is written next by state transition control unit 51.

Figure 4:
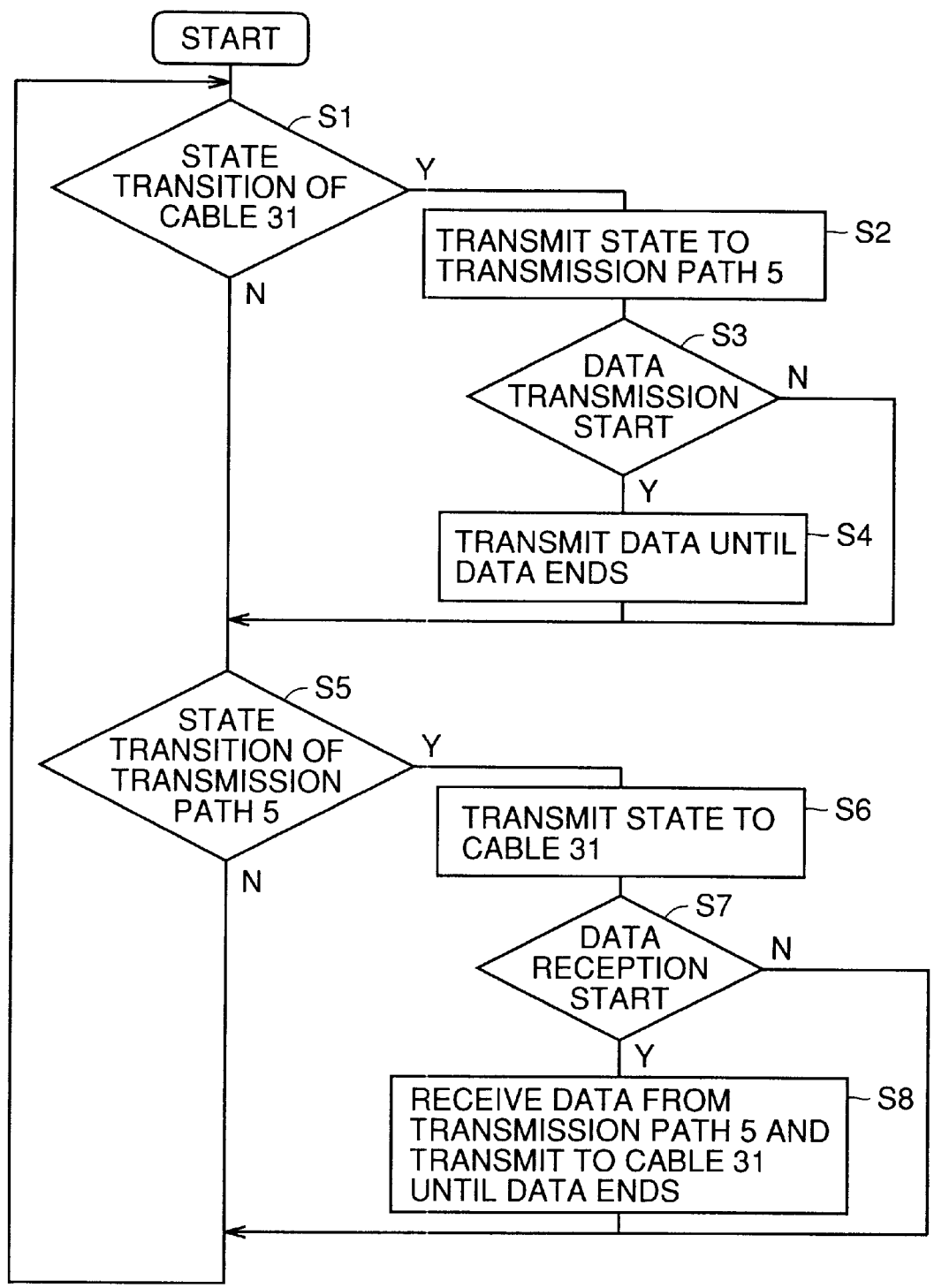
FIG. 4 is a flow chart of a main processing in a state transition control unit shown in FIG. 3.

FIG. 4 is a flow chart of a main process in state transition control unit 51 shown in FIG. 3. Referring to FIG. 4, the operation of state transition control unit 51 will be described.

First, through cable I/F unit 32, a state transition of cable 31 is detected (S1 in FIG. 4). The detected state is a state specified by 1394 standard, such as a state requesting user data transmission from the counterpart node to the node itself, or a state of granting priority of transmission from this side node to the other side node, in response to the data transmission request.

When the state transition of cable 31 is detected through cable I/F unit 32, state transition control unit 51 causes state transition on the side of transmission path 5 as the POF (S2). At this time, basically the same value as the state after transition on the side of cable 31 in accordance with 1394 standard is set to the state on the side of transmission path 5, that is, the content of unit 54 holding the output value to the POF. It should be noted that the state transition is represented in analog manner in accordance with 1394 standard, while it is represented in physical manner on the POF side, and therefore some conversion is necessary therebetween. Here, the conversion is realized by allocating analog state information represented by cable 31 in accordance with 1394 standard to a code of 4 bits.

Thereafter, whether the state of cable 31 allows entrance to user data transmission mode or not is determined (S3), and when data transmission mode is entered (Y in S3), the user data is received through cable I/F unit 32, the received data is converted at the first data converting unit 34, and transmitted through selector 40, POF input/output switching unit 36 and POF I/F unit 32 to the side of transmission path 5 of POF (S4). At this time, internal state of state transition control unit 51 indicates that the user data is being transmitted to the other node through transmission path 5, and user data transmitting state is continued. The data transmitting state is completed when a data completion state is received from the side of cable I/F unit 32.

When state transition of cable 31 is not detected (N in S1) or when data transmission mode is not entered (N in S3), or when the user data transmitting state is completed in S4, state transition on the side of transmission path 5 is detected (S5), and the detected state of transmission path 5 is transmitted converted to analog information, through unit 53 holding the output value to the cable, to cable 31 (S6).

At this time, when it is determined that the state of transmission path 5 is the state in which user data is being transmitted from the other side node and reception of the user data is to be started at this side (Y in S7), state transition control unit 51 makes a transition to a state for receiving the user data transmitted from the transmission path 5 (S8). At this time, the user data received from the transmission path 5 is converted at data converting unit 35 and transmitted to the side of cable 31. As to the internal state of state transition control unit 51, the state representing that the data is being received is maintained. When the state of data completion is detected on the side of transmission path 5, the data receiving state of state transition control unit 51 is terminated.

In accordance with 1394 standard, a procedure referred to as configuration, including address reallocation in addition to bus reset is performed. In this procedure, the state in accordance with 1394 standard is changed to a state of forming tree structure, a state of address allocation and so on. Such state transition is also implemented by converting and transmitting the state implemented on the side of cable 31 to transmission path 5, and by converting the state received from the transmission path 5 to the state of cable 31 and transmitting the same.

Figure 5:
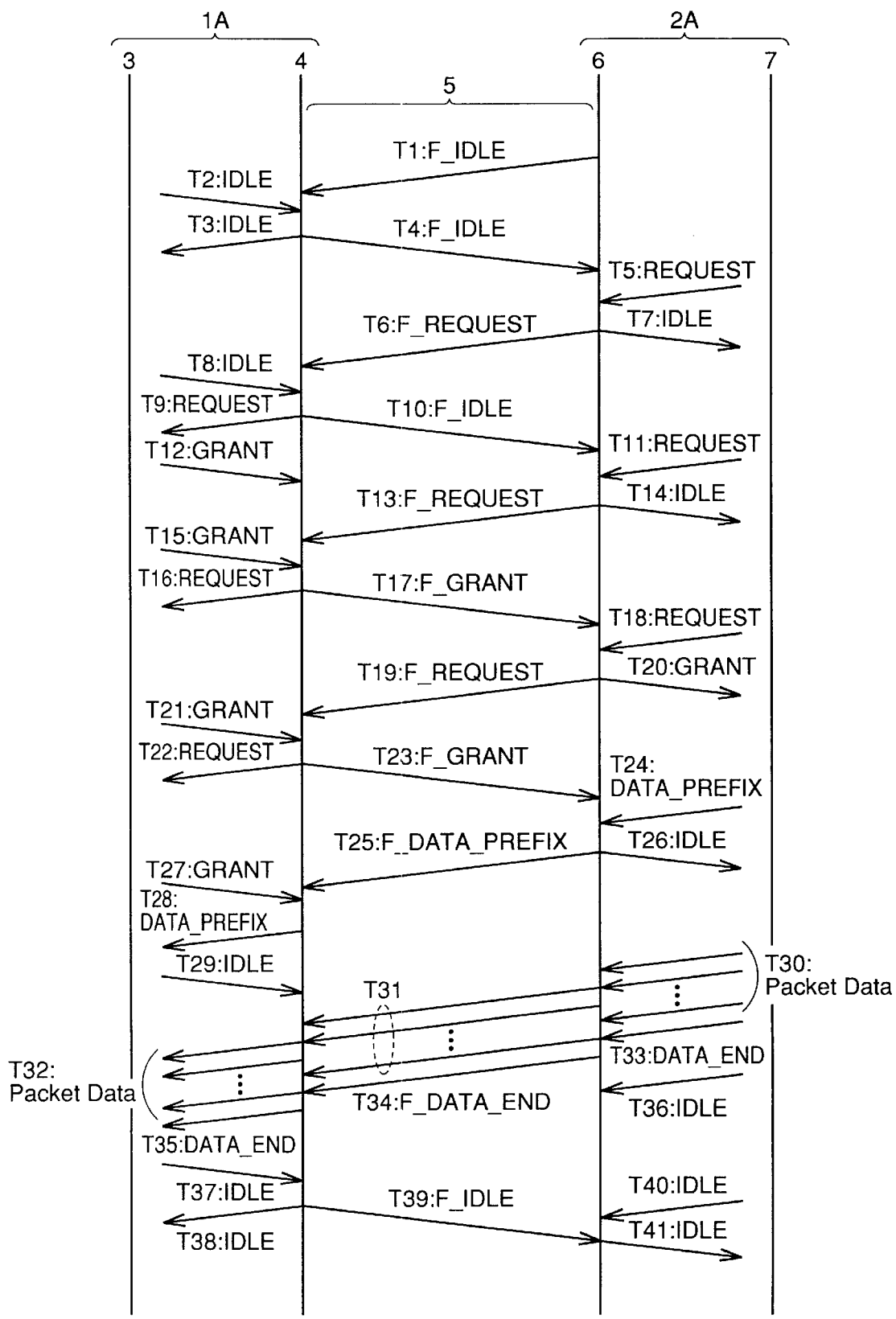
FIG. 5 shows a sequence of signal transmission in the system shown in FIG. 1.

FIG. 5 is a sequence of signal transmission in the system shown in FIG. 1. FIG. 5 shows only a sequence related to request/grant of user data transmission priority and transmission of the user data, which are main portions of the signal transmission sequence required in 1394 standard. Though other portions are described in the similar manner as the present sequence in the standard, description thereof is not given here.

FIG. 5 shows electric signals exchanged between full duplex-half duplex converting unit 4 and physical unit 3 of node 1A, signals transmitted over transmission path 5 as the POF, and electrical signals exchanged between full duplex-half duplex converting unit 6 and physical unit 7 of node 2A, shown in FIG. 1.

In FIG. 5, each signal represented as F_* * * * is a signal transmitted over transmission path 5, and has the clock superposed on the data. Other signals, for example, a signal represented by IDLE, are electric signals in accordance with 1394 standard. Other than data itself, at most 9 types of information such as transmission request and data prefix are defined in 1394 standard, and therefore, each signal represented as F_* * * * is used defined by data of about 4 bits.

By electric signals in accordance with 1394 standard, it is possible to transmit an indefinite value (represented by the reference character Z) other than 0 and 1. However, it is impossible for the optical signal on transmission path 5 to transmit the value Z. Therefore, information of electric signals in accordance with 1394 standard are all code-converted to 0 and 1 patterns, and thereafter transmitted as optical signals to transmission path 5. Therefore, a signal (for example IDLE) transmitted/received between physical unit 3 (7) and full duplex-half duplex converting unit 4 (6) is different from the signal (for example, F_IDLE) on transmission path 5. The code conversion between the optical signals and the electric signals is performed entirely by the first and second data converting units 34 and 35 of full duplex-half duplex converting unit 4 (6) as well as the reception side circuitry 371 and transmission side circuitry 372 of POF I/F unit 37. Information representing state on transmission path 5 (for example, F_IDLE or F_GRANT) is represented by a series of 0s and 1s having a length of about 4 to about 10 bits. The bit length for representation is selected arbitrarily, considering convenience in handling by each system.

The signal transmission sequence of the system shown in FIG. 1 will be described with reference to FIG. 5.

First, from full duplex-half duplex converting unit 6 of node 2A through transmission path 5 to full duplex-half duplex converting unit 4, F_IDLE signal T1 is transmitted. An IDLE signal T2 output from physical unit 3 to full duplex-half duplex converting unit 4 is a signal asynchronous with the signal T1, and it indicates that the physical unit 3 is in the IDLE state.

Full duplex-half duplex converting unit 4 reads received signals T1 and T2 and, as a result, transmits the received signal T1 as IDLE signal T3 to physical unit 3, and transmits the receive signal T2 as F_IDLE signal T4 to full duplex-half duplex converting unit 6. In other words, at this time point, the signal T1 received from full duplex-half duplex converting unit through transmission path 5 is subjected to code conversion from F_IDLE→IDLE and transmitted to physical unit 3 and in the similar manner, the signal T2 obtained from physical unit 3 is subjected to code conversion from IDLE→F_IDLE and transmitted to full duplex-half duplex converting unit 6.

Thereafter, REQUEST signal T5 for obtaining priority of transmission of the user data by a signal T31, which will be described later, through transmission path 5 is output from physical unit 7 to full duplex-half duplex converting unit 6. Full duplex-half duplex converting unit 6 receives the signal T5, converts it to F_REQUEST signal T6 and transmits to transmission path 5, and converts the signal F_IDLE signal T4 from full duplex-half duplex converting unit 4 to IDLE signal T7, which signal is transmitted to physical unit 7.

Thereafter, in the similar manner, by a series of transmission/reception operation represented by IDLE signal T8 to F_GRANT signal T23, the user data transmission priority represented by GRANT signal is applied to physical unit 7.

FIG. 5 shows the GRANT signal for granting transmission authorization of the user data to full duplex-half duplex converting unit 6 which is read three times as T12, T15 and T21 by full duplex-half duplex converting unit 4. Similarly, the REQUEST signal for obtaining user data transmission priority is shown as issued three times as signals T5, T11 and T18 from physical unit 7 to full duplex-half duplex converting unit 6.

As GRANT signal T20 representing grant of transmission priority is received by physical unit 7 in the above described manner, DATA_PREFIX signal T24 suggesting transmission of user data thereafter is output from physical unit 7 to full duplex-half duplex converting unit 6. As F_DATA_ PREFIX signal T25 corresponding to the signal T24 is received at full duplex-half duplex converting unit 4, the repeated operation of reception and transmission for request/ granting transmission priority which has been performed through transmission path 5 is stopped, so that nothing is transmitted. This is because, according to 1394 standard, the full duplex-half duplex converting unit 4 makes a transition to the state of waiting for reception of the user data represented by the signal T31, as it is specified by the standard that the user data will be received following the reception of DATA_PREFIX signal. The present transmission sequence is different in this point from the full duplex communication by a common pingpong operation. More specifically, not all communications through transmission path 5 are performed in full duplex communication but user data transmission/ reception requiring much time for communication is processed in the communication unit 33 utilizing 1394 standard. Therefore, the pingpong operation of transmission-reception can be dispensed with, so that full duplex-half duplex converting unit 4 (6) performs either the user data transmission operation or the user data receiving operation only.

User data transmission will be described in the following. One or more Packet Data signals T30 are transmitted as user data from physical unit 7 to full duplex-half duplex converting unit 6, and therefore full duplex-half duplex converting unit 6 receives these signals, successively converts these signals to signals T31 and transmits the converted signals to transmission path 5.

Full duplex-half duplex converting unit 4 continuously receives the signals T31 through transmission path 5, successively converts the received signals to Packet Data signals T32 and transmits the converted signals to physical unit 3. The process is continued until DATA_END signal T33 output from physical unit 7 indicating completion of user data transmission is received as F_DATA_END signal T34 at full duplex-half duplex converting unit 4.

When F_DATA_END signal T34 is received by full duplex-half duplex converting unit 4, the repeated operation of transmission and reception is resumed. More specifically, full duplex-half duplex converting unit 4 reads the state of physical unit 3, and a signal in accordance with the read state (in this example, F_IDLE signal T39) is transmitted to full duplex-half duplex converting unit 6.

In the above described signal transmission sequence, basically, the state of physical unit 3 (7) is transmitted as a signal to transmission path 5, and the state of transmission path 5 is output as a signal to physical unit 3 (7). At this time, signal transmission to transmission path 5 takes place after it is confirmed or ensured by a method using a timer that a signal transmitted over transmission path 5 is received by the node, so that the transmission signal and the reception signal never collide on the transmission path 5.

The user data is transmitted by half duplex communication in accordance with 1394 standard, full duplex-half duplex converting unit 4 stops the above described repeated operation of transmission and reception when DATA_ PREFIX signal T25 is received, and receives the user data continuously. When F_DATA_END signal T34 is received, the repeated operation of transmission and reception is again resumed.

As to the logic timing of full duplex-half duplex converting unit 4, there are various timings such as data reception timing through transmission path 5, internal clock of full duplex-half duplex converting unit 4, and timing of data conversion at physical unit 3. There are various methods of realizing reception/transmission, state transition in full duplex-half duplex converting unit 4 and so on in accordance with combination of these timings. Details of such methods are not given here.

(Second Embodiment)

Figure 6:
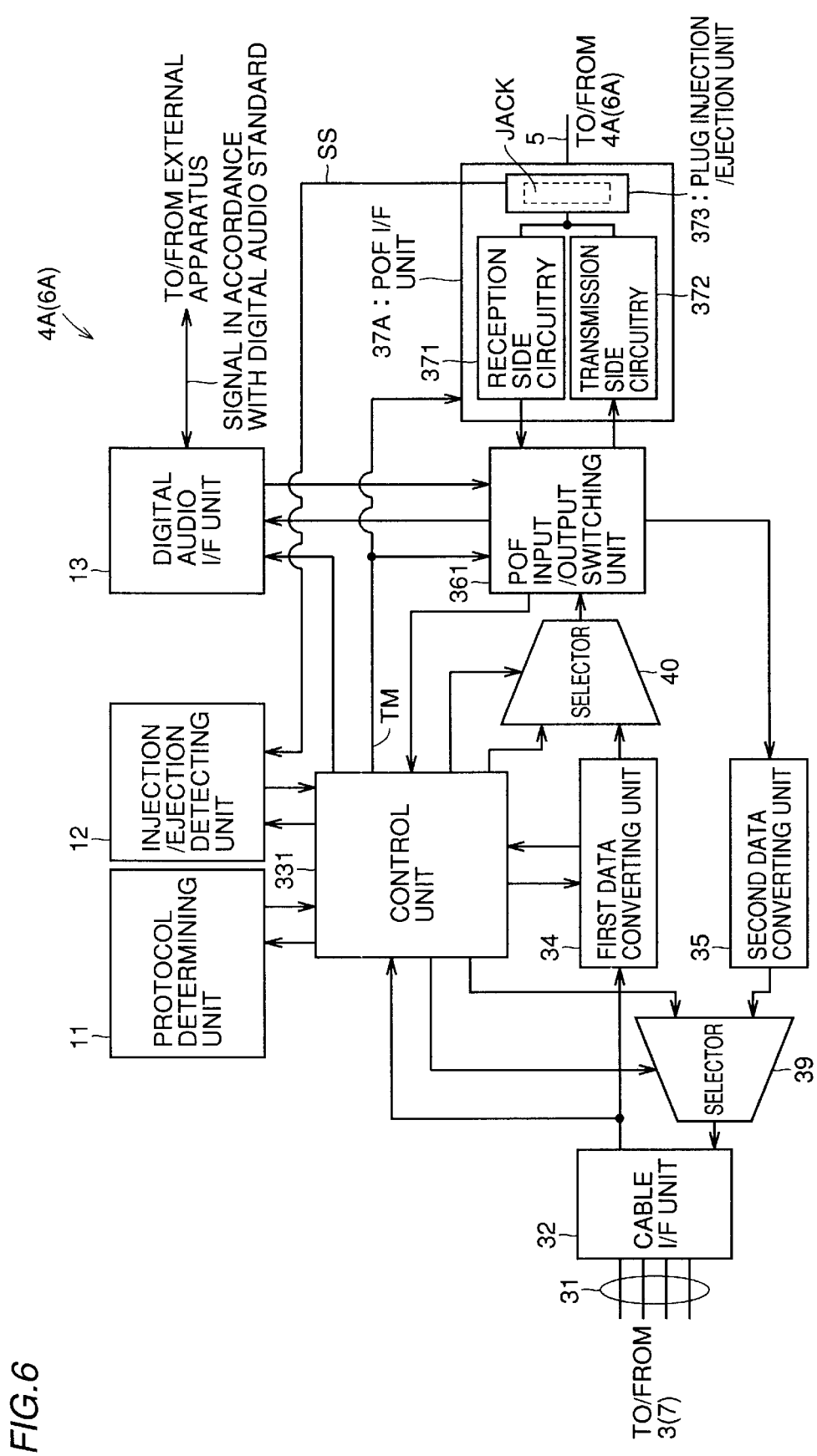
FIG. 6 is a block diagram of a full duplex-half duplex converting unit in accordance with a second embodiment of the present invention.

FIG. 6 is a block diagram of full duplex-half duplex converting unit 4A (6A) in accordance with the second embodiment of the present invention. Full duplex-half duplex converting unit 4A (6A) shown herein is provided in place of full duplex-half duplex converting unit 4 (6) of node 1A (2A) shown in FIG. 1. Full duplex-half duplex converting block 4A (6A) differs from the block configuration of full duplex-half duplex converting unit 4 (6) of FIG. 2 in that control unit 33, POF input/output switching unit 36 and POF I/F unit 37 of FIG. 2 are replaced by control unit 331, POF input/output switching unit 361 and POF I/F unit 37A, respectively, and that full duplex-half duplex converting unit 4A (6A) of FIG. 6 additionally includes a protocol determining unit 11, an injection/ejection detecting unit 12 and a digital audio I/F unit 13. Except these points, the structure shown in FIG. 6 is the same as that of FIG. 2.

POF I/F unit 37A includes the above described reception side circuitry 371, transmission side circuitry 372 and plug injection/ejection unit 373. Plug injection/ejection unit 373 is a jack corresponding to a plug, not shown, of transmission path 5 and has a switch mechanism, and it detects injection/ejection of the plug and outputs an on/off switch signal SS to injection/ejection detecting unit 12.

Protocol determining unit 11 determines whether transmission protocol is in accordance with 1394 standard or digital audio protocol, based on the signal on transmission path 5 input through POF I/F unit 37A, POF input/output switching unit 361 and control unit 331, and outputs the result of determination to control unit 331.

Injection/ejection detecting unit 12 determines whether a plug for connecting transmission path 5 is inserted to or ejected from the node itself based on the signal SS, and outputs the result of determination to control unit 331.

Digital audio I/F unit 13 exchanges signals in accordance with digital audio standard to and from full duplex-half duplex converting unit 4A (6A) and an external apparatus, not shown.

The digital audio signal input from the external apparatus is transmitted through digital audio I/F unit 13, POF input/output switching unit 361 and POF I/F unit 37A to transmission path 5, and the digital audio signal from transmission path 5 is applied through the reverse route to the external apparatus.

In addition to the control function of control unit 33 described with reference to FIG. 2, control unit 331 has a function of controlling digital audio I/F unit 13, protocol determining unit 11 and injection/ejection detecting unit 12.

FIG. 7 shows a process flow at the full duplex-half duplex converting unit 4A (6A) when the plug is inserted, in accordance with the second embodiment of the present invention. Referring to FIG. 7, the operation of full duplex-half duplex converting unit 4A (6A) when the plug is inserted will be described.

When a notice that the plug is inserted is input from injection/ejection detecting unit 12 to control unit 331, control unit 331 attempts signal reception through transmission path 5 through POF I/F unit 37A and POF input/output switching unit 361 (S11), and confirms whether reception is successful (S12). If signal reception has been successful (Y in S12), control unit 331 applies the received signal to protocol determining unit 11, and protocol determining unit 11 determines the protocol related to the received signal (S13).

Protocol determining unit 11 determines the protocol of the received signal to be a signal in accordance with digital audio standard, 1394 standard or other standard. A signal of at most 10 Mbps appears as the digital audio signal, and even when it is subjected to bi-phase modulation, data of 20 Mbps at most is received. By contrast, data of at least 100 Mbps is required in accordance with 1394 standard. Therefore, protocol determining unit 11 operates two different PLLs simultaneously for the received signal, so as to determine the protocol based on the lock state, or to determine protocol by measuring timing of determination of 0 and 1.

Upon reception of the result of protocol determination by protocol determining unit 11, control unit 331 determines whether the received signal is a digital audio signal (S14). If the received signal is determined to be the digital audio signal (Y in S14), control unit 331 switches a signal output side of POF input/output switching unit 361 to digital audio I/F unit 13, so as to enter a state for receiving the digital audio signal (S16). Consequently, the received digital audio signal is applied to the external apparatus. This is the conventional operation, and therefore detailed description will not be given.

When it is determined that the received signal is in accordance with 1394 standard (Y in S15), control unit 331 enters a processing mode in accordance with 1394 standard. This processing is as described with reference to FIGS. 5 and 6, and therefore description is not repeated.

Control unit 331 makes an attempt to receive for a prescribed time period through transmission path 5 (loop process in steps S11, S12 and S18). After the attempt of reception for a prescribed time period, if signal reception fails, that is, when there is a time out (N in S18), the process following S19 starts, which will be described later.

The time out occurs when a plug of the opposing side of the transmission path 5 having one plug inserted, is not yet inserted to the counter node, or when the counterpart node has not yet entered the communication state. If the counterpart node is capable of processing in accordance with 1394 standard, it may be the case that the counterpart node is waiting for detection of connection by this side node. The process following the step S19 is executed for addressing such situation.

Control unit 331 of this side node transmits a signal indicating that an operation in accordance with 1394 standard is possible, to the node of the other side (S19). For example, it transmits BUS RESET signal or IDLE signal, among the signals in accordance with 1394 standard. Control unit 331 of this side node makes an attempt to receive a response corresponding to the transmitted signal (S20). If a corresponding response is received (Y in S21), protocol determination is done in protocol determining unit 11 of this side node in accordance with the received content (S22), and if it is recognized that the result of protocol determination is a protocol in accordance with 1394 standard (Y in S23), control unit 331 enters a communication mode in accordance with 1394 standard (S24).

Conversely, when no response is received after a prescribed number of transmission to the other side node (Yin S19 to S21 and S25), control unit 331 enters a process shown in FIG. 9, which will be described later. The transmitting operation is repeated for a plurality of times in order that this side node can surely receive a response from the other node even when the other node is in an intermittent receiving operation state for reducing power consumption, for example.

FIGS. 8A and 8B show signal transmission sequence corresponding to the flow of FIG. 7. FIG. 8 shows an example when the counterpart node corresponds to 1394 standard. Here, when injection of a plug is detected by control unit 331 of this side node, an attempt for reception through transmission path 5 is made. In the example shown in FIG. 8A, no signal is transmitted from the other node, and therefore this side node makes an attempt of receiving operation for a prescribed time period and, thereafter, transmits a first bus reset signal to the other node. When a second bus reset signal is transmitted and a response is received from the other node, signal transmission sequence in accordance with 1394 standard starts between the nodes on this side and the other side.

FIG. 8B shows an example in which the counterpart node does not correspond to 1394 standard, and a digital audio signal has already been transmitted from the counterpart node to transmission path 5. At this time, when control unit 331 of this side node receives the signal from transmission path 5, it receives the digital audio signal, and therefore this side node is thereafter set to a state for receiving the digital audio signal.

Figure 9:
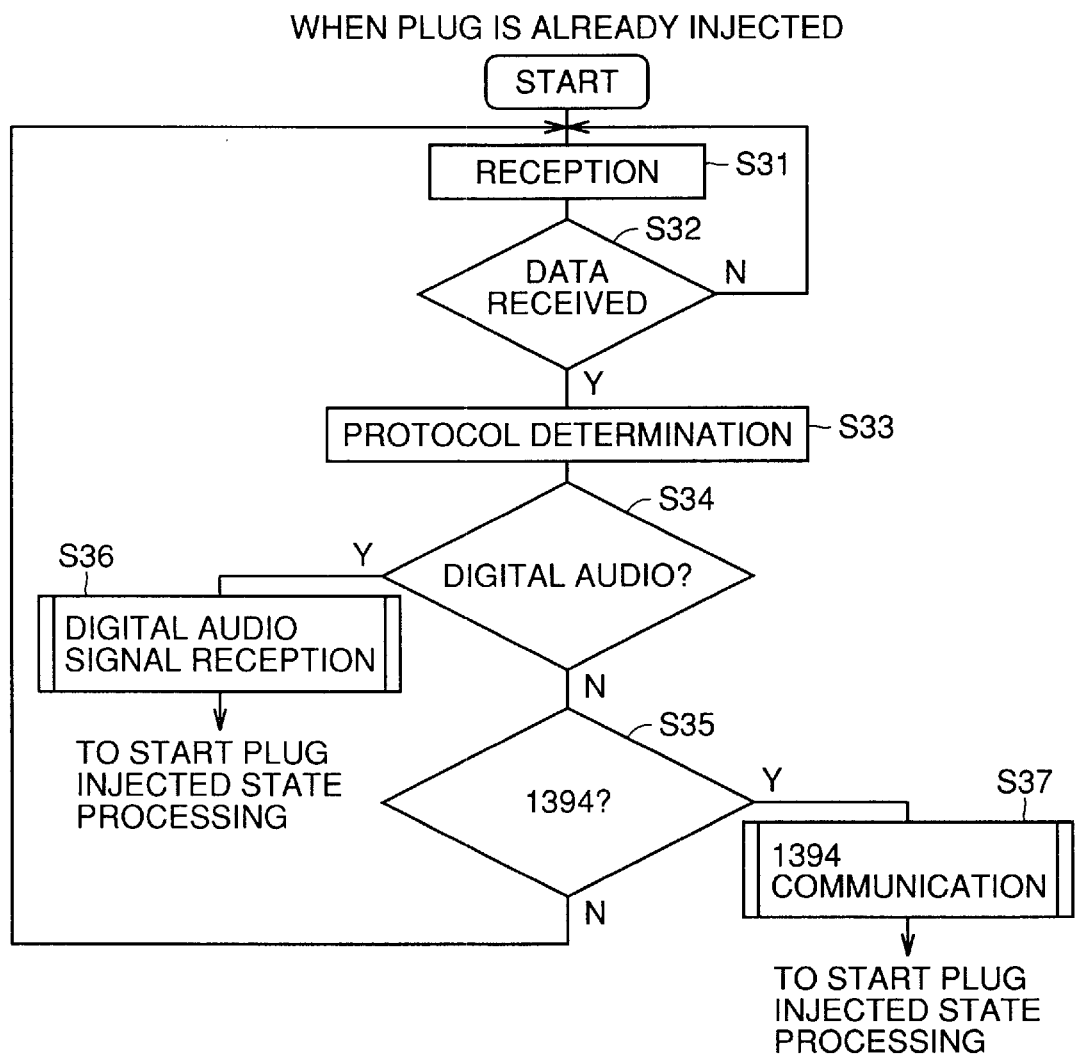
FIG. 9 shows a process flow at the full duplex-half duplex converting unit with the plug injected, in accordance with the second embodiment of the present invention.

FIG. 9 shows a process flow at full duplex-half duplex converting unit 4A (6A) when the plug has been injected, in accordance with the second embodiment of the present invention. In the process flow, steps S31 to S37 are the same as the steps S1 to S17 of FIG. 7. The process flow shown in FIG. 9 differs from that of FIG. 7 in that a process related to the time out in the receiving operation (S18 to S25 of FIG. 27) is omitted, and that a process for continuously attempting receiving operation takes place (loop process of steps S31 and S32).

Figure 10B:
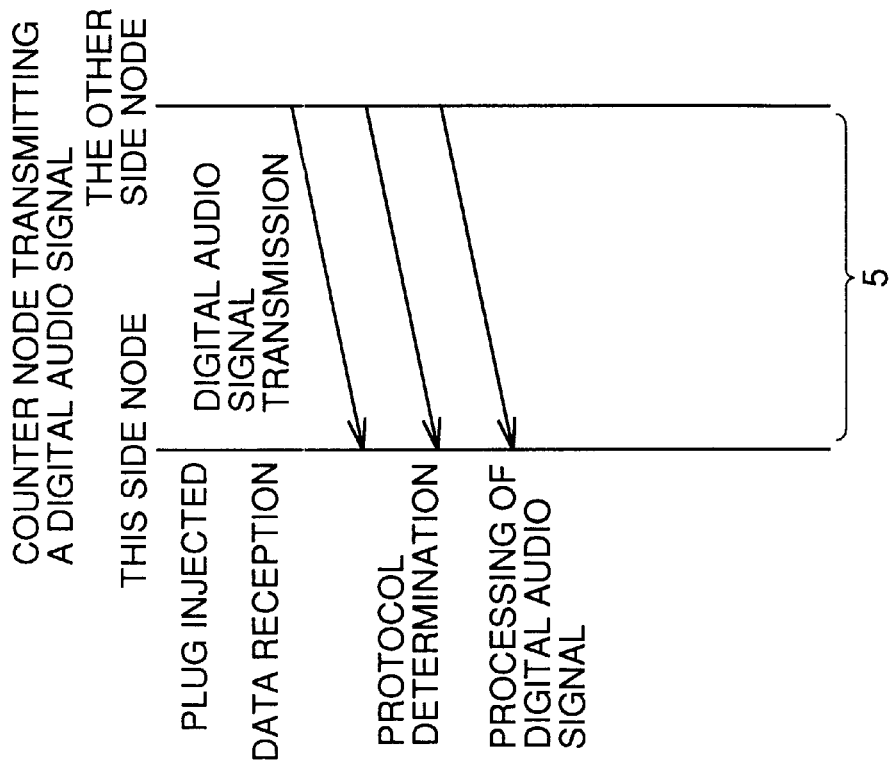
FIGS. 10A and 10B show sequences of signal transmission corresponding to the flow of FIG. 9, respectively.
Figure 10A:
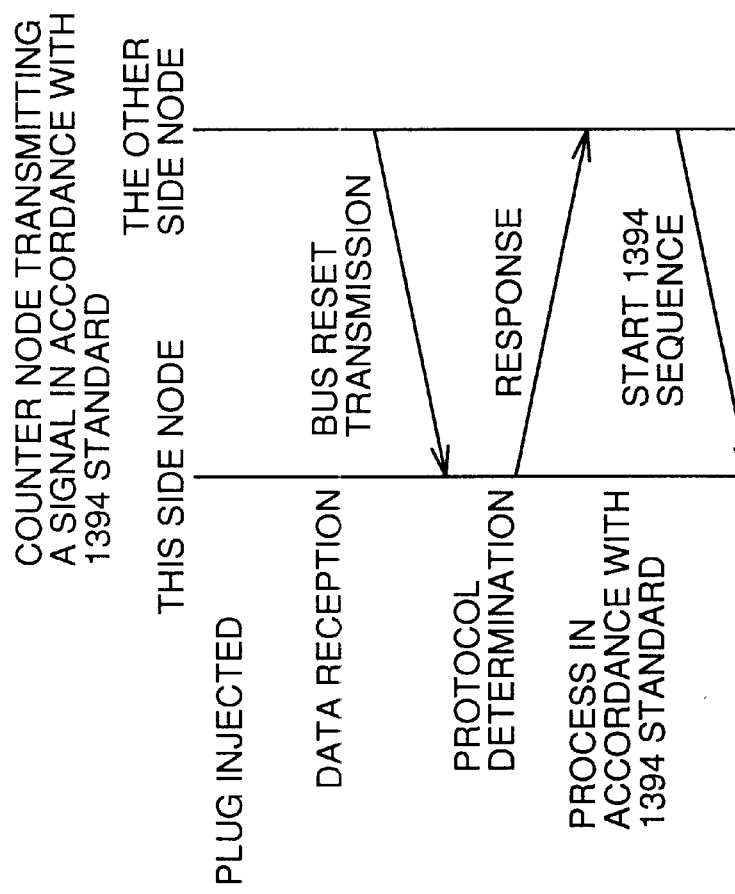

FIGS. 10A and 10B show signal transmission sequence corresponding to the process flow of FIG. 9. FIG. 10A shows an example when the counterpart node corresponds to 1394 standard. In the example of FIG. 10A, the plug has been already injected to this side node, and therefore the node is ready to receive the signal from the other node through transmission path 5. When a signal in accordance with 1394 standard such as the bus reset signal is received at this side node from the other node, protocol determination is made by protocol determining unit 11 based on the received signal. When the result of determination indicates that the protocol is in accordance with 1394 standard, control unit 331 performs a response operation in accordance with 1394 standard. Thereafter, signal transmission sequence in accordance with 1394 standard starts between one and the other nodes.

FIG. 10B shows an example in which the counterpart node corresponds to digital audio standard. In this side node, protocol determination takes place in the similar manner as the example of FIG. 10A, and in accordance with the result of determination, a process corresponding to digital audio standard takes place in the control unit 331 of this side node.

Referring to FIGS. 8A and 8B as well as 10A and 10B, when this side node is to transmit a digital audio signal to the other node, first, it is confirmed that the plug has been injected and that communication process in accordance with 1394 standard is not being performed, and thereafter a digital audio signal is transmitted to transmission path 5. This corresponds to a situation where a play button of a CD, which is one of the external apparatuses shown in FIG. 6 is pressed, and if POF I/F unit 37A is a digital audio output terminal, then a digital audio signal is transmitted from the terminal.

In accordance with the digital audio standard, the signal is transmitted only in one direction from one to the other node, and therefore the jack is basically used for reception only or transmission only. Therefore, when it is limited for reception only or transmission only, the flow (sequence) for signal transmission described above can be made simple. However, the flow (sequence) is described here not limiting the function to reception or transmission only.

In the present embodiment, each node has digital audio signal transmission/reception function and 1394 standard transmission/reception function. By analyzing a received signal, it is determined whether the other node handles digital audio signal or a signal in accordance with 1394 standard, and based on the determination, one of these transmission/reception functions is set operative. Therefore, by utilizing one set of jack and plug, it is possible for each node to transmit digital audio signal and the signal in accordance with 1394 standard, to and from the other node.

(Third Embodiment)

In the third embodiment of the present invention, the shapes of the plug and jack used in the first and second embodiments are made to be compatible with the well known small plug, a so-called mini plug (EIAJ RC-6701A standard), and provided at the equipments (node).

Figure 11:
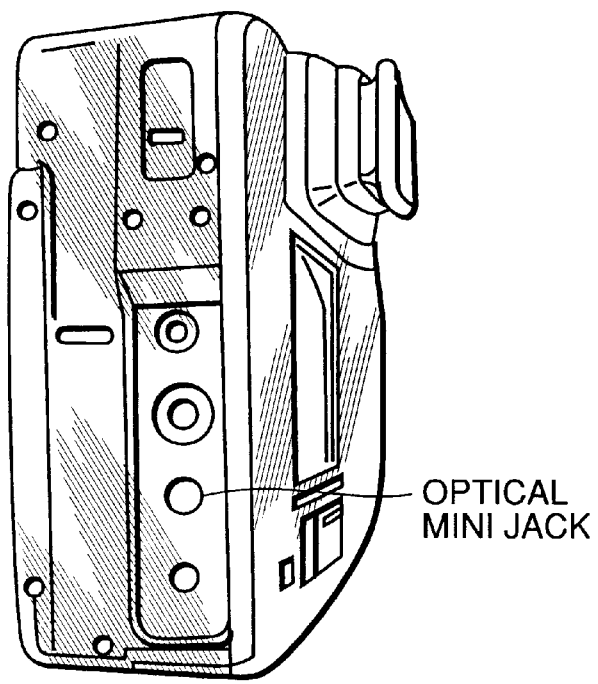
FIG. 11 shows an appearance of an equipment provided with a mini jack corresponding to a mini plug used in the first and second embodiments of the present invention.
Figure 12:
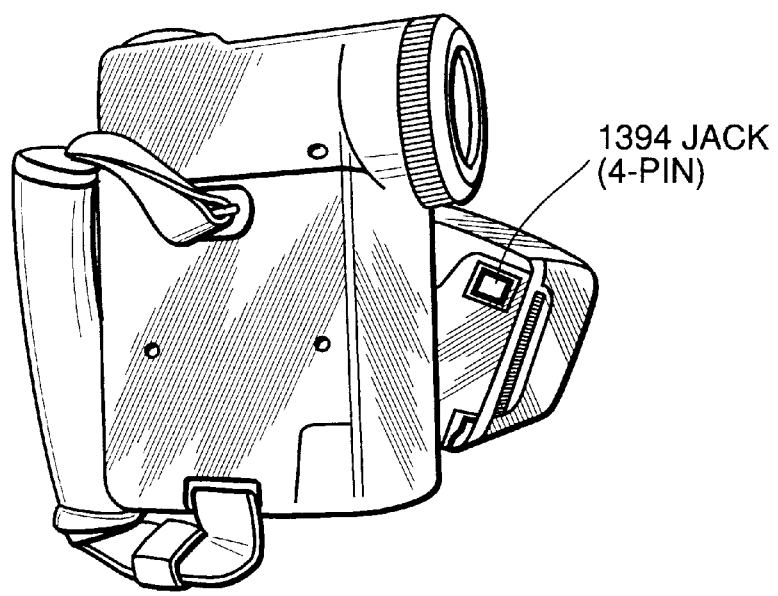
FIG. 12 shows an appearance of an equipment provided with a 4-pin connector jack in accordance with 1394 standard used in the first and second embodiments of the present invention.
Figure 15A:
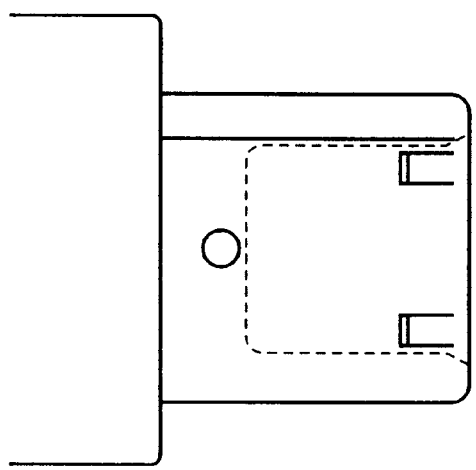
FIGS. 15A to 15C show an upper surface, a side surface and a contact surface with the jack of the plug shown in FIG. 14B, respectively.
Figure 15B:
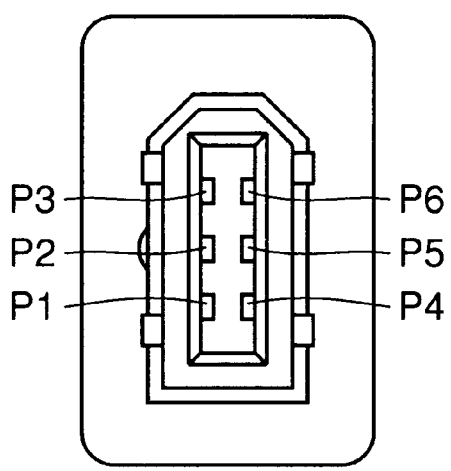
Figure 15C:
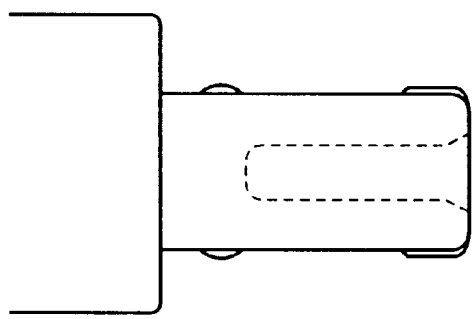
Figure 16:
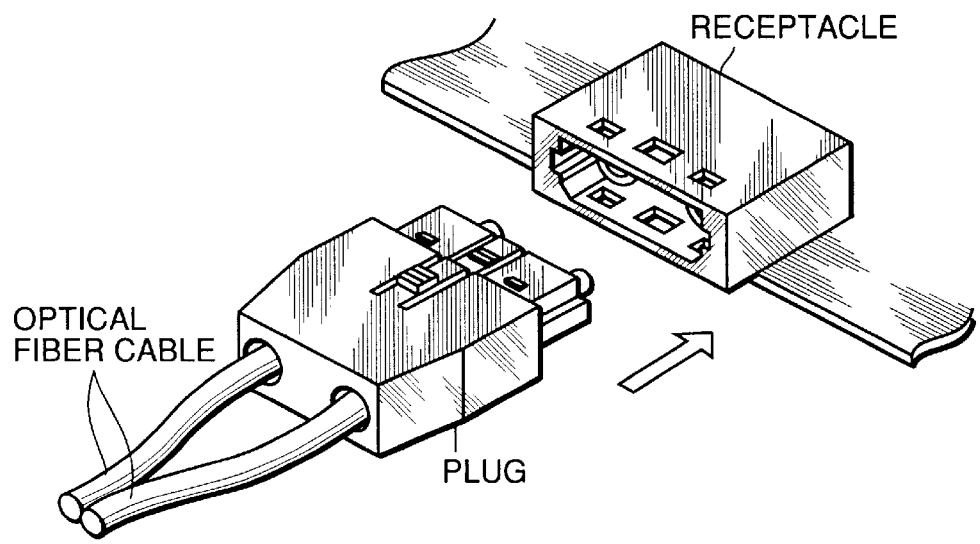
FIG. 16 shows a shape of conventionally proposed optical jack and plug (RECEPTACLE).

FIG. 11 shows appearance of an equipment provided with a mini jack corresponding to a mini plug used in the first and second embodiments. FIG. 12 shows appearance of an apparatus provided with a 4-pin connector jack in accordance with 1394 standard, used in the first and second embodiments. In this figures, an example in which the jack is mounted on a digital camera capable of recording/reproducing image or voice is shown.

FIG. 13 shows an appearance of an optical fiber plug having the shape of the mini jack in accordance with the third embodiment of the present invention. FIG. 13 shows an appearance of the mini plug used in the first and second embodiments connected to the POF. In a conventional equipment (node) such as a digital camera, a jack corresponding to the 4-pin plug shown in FIG. 14A or a jack corresponding to the 6-pin plug shown in FIG. 14B has been necessary. In the third embodiment, it is possible to provide a jack corresponding to the optical fiber plug having the shape of the mini jack shown in FIG. 13 with the equipment (node), and therefore the equipment can be made smaller as compared with the prior art example. Further, as the conventional digital audio terminal can be used as the jack, commercially available digital audio POF can be used as the transmission path 5, and therefore cost can be reduced.

As described above, the high speed bus in accordance with 1394 standard connected by two types of signal lines can be implemented by one type of signal line. When the signal line is formed of an optical fiber, as compared with the prior art requiring two optical fibers, only one optical fiber has to be used for implementation, and as a result, not only the number of optical fibers but also the space occupied by the plugs and jacks can be reduced to about one half, and handing is far easier for the user.

Further, the cost for the optical fiber, photo-electric converting portion, plug and jack can be reduced. Further, as half duplex communication takes place, power consumption can be reduced as compared with signal transmission by full duplex communication. Further, as the structure is simplified, maintenance is facilitated and reliability increases.

Further, as described in the third embodiment, as the plug is adapted to have the same shape as the conventional mini plug, it becomes possible to reduce the size of the plug as compared with the conventional plug in accordance with 1394 standard, and therefore it becomes possible to use already commercially available digital audio optical fiber.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal transmission system for transmitting data in a serial manner by mutual communication, comprising:
   a first signal transmission apparatus having a first connection port;
   a second signal transmission apparatus having a second connection port;
   a first full duplex communication path connected to said first connection port for bidirectional simultaneous communication of data as two types of signals;
   a second full duplex communication path connected to said second connection port for bi-directional simultaneous communication of data as two types of signals;
   a half duplex communication path capable of non-simultaneous bi-directional communication of data as single types of signals; a first converting unit having first and second input/output ports, said first converting unit (i) being connected at said first input/output port to said first full duplex communication path and at said second input/output port to said half duplex communication path so as to be capable of receiving data from said first full duplex communication path, converting data received from said first full duplex communication path into first signals capable of being transmitted through said half duplex communication path and outputting said first signals to said half duplex communication path through said second input/output port, and (ii) being adapted to alternatively receive second signals from said half duplex communication path, to convert said second signals into two signal type data, and to output said that two signal type data through said first full duplex communication path to said first signal transmission apparatus;
   a second converting unit having third and fourth input/output ports, said second converting unit (i) being connected at said third input/output port to said second full duplex communication path and at said fourth input/output port to said half duplex communication path so as to be capable of receiving data from said second full duplex communication path, converting data received from said second full duplex communication path into said second signals capable of being transmitted through said half duplex communication path, and outputting said second signals to said half duplex communication path through said fourth input/output port, and (ii) being adapted to alternatively receive said first signals from said half duplex communication path, to convert said first signals into two signal type data, and to output that two signal type data to said second signal transmission apparatus through said second full duplex communication path; and
   a control unit for controlling communication operations in said system,
   said control unit defining a first mode of communication and a second mode of communication between said first signal transmission apparatus and said second signal transmission apparatus that operate in a control sequence, said first mode of communication granting priority of transmission alternately to said first signal transmission apparatus and to said second signal transmission apparatus using said half duplex communication path, and said second mode of communication granting priority to only one of said first signal transmission apparatus or said second signal transmission apparatus using said half duplex communication path.

2. The signal transmission system according to claim 1, wherein said half duplex communication path is capable of transmitting signals in accordance with a plurality of protocols including at least a protocol specified for a selected one of said full duplex communication paths;
   said apparatus further comprising:
   processing means for receiving as an input and processing a signal in accordance with a protocol other than said specified protocol among said plurality of protocols; and
   protocol determining means for determining the protocol of the signal received from said half duplex communication path; wherein said control unit includes control means for controlling signals such that based on a determination by said protocol determining means, among signals received from said half duplex communication path, a signal in accordance with said specified protocol is transmitted to said selected one of said full duplex communication paths and a signal in accordance with a protocol other than said selected protocol is applied to said processing means.

3. The signal transmission system according to claim 2, wherein a signal in accordance with a protocol other than said specified protocol includes a digital audio signal.

4. The signal transmission system according to claim 1, further comprising, when said half duplex communication path is connected to said signal transmission apparatus by means of a plug, a plug injection/ejection unit having a jack to and from which said plug is injected/ejected; and
   a plug detecting unit for detecting injection of said plug to said jack at said plug injection/ejection unit; wherein said control unit includes reception maintaining means responsive to detection by said plug detecting unit that said plug is injected to said jack, for maintaining a receiving operation for a prescribed time period until a signal is received from said half duplex communication path.

5. A signal transmission system for transmitting data in a serial manner by mutual communication, comprising:
   a first signal transmission apparatus having a first connection port;
   a second signal transmission apparatus having a second connection port;
   a first full duplex communication path connected to said first connection port for bidirectional simultaneous communication of data as two types of signals;
   a second full duplex communication path connected to said second connection port for bi-directional simultaneous communication of data as two types of signals;
   a half duplex communication path capable of non-simultaneous bi-directional communication of data as single types of signals; a first converting unit having first and second input/output ports, said first converting unit (i) being connected at said first input/output port to said first full duplex communication path and at said second input/output port to said half duplex communication path so as to be capable of receiving data from said first full duplex communication path, converting data received from said first full duplex communication path into first signals capable of being transmitted through said half duplex communication path and outputting said first signals to said half duplex communication path through said second input/output port, and (ii) being adapted to alternatively receive second signals from said half duplex communication path, to convert said second signals into two signal type data, and to output said that two signal type data through said first full duplex communication path to said first signal transmission apparatus;

a second converting unit having third and fourth input/output ports, said second converting unit (i) being connected at said third input/output port to said second full duplex communication path and at said fourth input/output port to said half duplex communication path so as to be capable of receiving data from said second full duplex communication path, converting data received from said second full duplex communication path into said second signals capable of being transmitted through said half duplex communication path, and outputting said second signals to said half duplex communication path through said fourth input/output port, and (ii) being adapted to alternatively receive said first signals from said half duplex communication path, to convert said first signals into two signal type data, and to output that two signal type data to said second signal transmission apparatus through said second full duplex communication path; and a control unit for controlling communication operations in said system, said control unit defining a first mode of communication and a second mode of communication between said first signal transmission apparatus and said second signal transmission apparatus that operate in a control sequence, said first mode of communication granting priority of transmission alternately to said first signal transmission apparatus and to said second signal transmission apparatus using said half duplex communication path, and said second mode of communication granting priority to only one of said first signal transmission apparatus or said second signal transmission apparatus using said half duplex communication path; and when said communication path is connected to said signal transmission apparatus by means of a plug, a plug injection/ejection unit having a jack to and from which said plug is injected/ejected; and a plug detection unit for detecting injection of said plug to said jack at said injection/ejection unit; wherein said control unit includes reception maintaining means responsive to detection by said plug detecting unit that said plug is injected to said jack, for maintaining a receiving operation for a prescribed time period until a signal is received from said half duplex communication path; and wherein said control unit further includes a transmission repeating means responsive to a failure of reception of any signal from said half duplex communication path by said reception maintaining means, for repeatedly transmitting a prescribed signal for a prescribed number of times to said half duplex communication path until a response is received from said half duplex communication path.

6. The signal transmission apparatus according to claim 4, wherein said plug has the same shape as a mini plug.

7. The signal transmission system according to claim 1, wherein said half duplex communication path is a single fiber optic strand.

8. The signal transmission system according to claim 1, wherein said half duplex communication path is capable of transmitting signals in accordance with the IEEE 1394 protocols defined for said first cable and for said second cable.

9. A signal transmission apparatus for transmitting data in a serial manner by mutual communication, comprising:

a cable connected to one end of said signal transmission apparatus for bidirectional simultaneous communication of said data as two types of signals;

a communication path connected to the other end of said signal transmission apparatus for communication with another signal transmission apparatus;

a first converting unit receiving said data from said cable, converting the received data to one type of signal and sending out said one type of signal to said communication path in said data transmission;

a second converting unit receiving said one type of signal from said communication path, converting the received signal to said data and sending out it to said cable in said data transmission;

a control unit for controlling a communication operation by said signal transmission in said data transmission, said control unit granting priority of transmission alternately to said signal transmission apparatuses in a control sequence for said communication operation using said communication path; and when said communication path is connected to said signal transmission apparatus by means of a plug, a plug injection/ejection unit having a jack to and from which said plug is injected/ejected; and a plug detection unit for detecting injection of said plug to said jack at said injection/ejection unit; wherein said control unit includes reception maintaining means responsive to detection by said plug detecting unit that said plug is injected to said jack, for maintaining a receiving operation for a prescribed time period until a signal is received from said communication path; and wherein said control unit further includes a transmission repeating means responsive to failure of reception of any signal from said communication path by said reception maintaining means, for repeatedly transmitting a prescribed signal for a prescribed number of times to said communication path until a response is received from said communication path.

* * * * *